Figure 1:
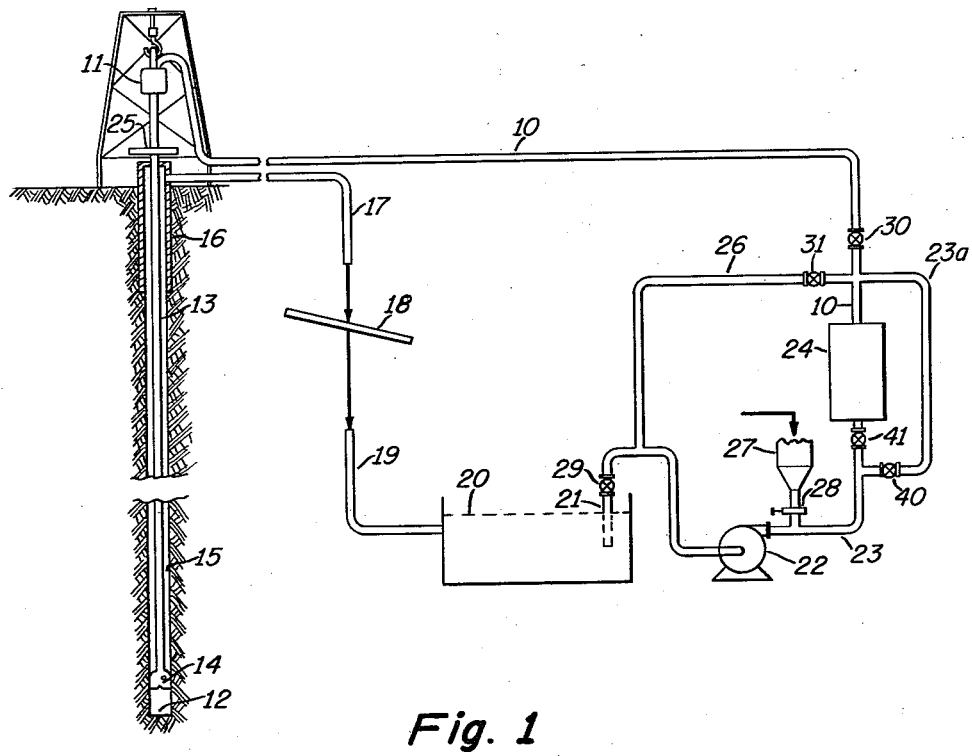

Nov. 27, 1956  E. A. JOHNSON  2,772,073
HOMOGENIZING OF DRILL MUDS
Filed March 22, 1952

INVENTOR.
Everett A. Johnson
BY
Pike H. Sullivan
ATTORNEY

United States Patent Office 2,772,073
Patented Nov. 27, 1956

2,772,073

HOMOGENIZING OF DRILL MUDS

Everett A. Johnson, Park Ridge, Ill., assignor to Standard Oil Company, Chicago, Ill., a corporation of Indiana Application March 22, 1952, Serial No. 277,977

2 Claims. (Cl. 255—1.8)

This invention relates to the treating and conditioning of drilling fluids employed in the drilling of wells, and also relates to the preparation of said drilling fluids.

In the rotary drilling of wells, drilling muds are circulated into and out of the well during the drilling operation. Such muds should be maintained at a desired viscosity, have certain thixotropic properties, and should also have a minimum liquid loss to the formation during the drilling operation.

In the normal course of rotary drilling, mud is pumped by means of a slush pump through the drill pipe or stem to the bit at the bottom of the drill pipe. After passing through the ports in the drill bit the mud is returned to the surface through the annulus between the drill pipe and the wall of the bore hole or the casing, carrying in suspension any formation cuttings which have been drilled by the rotary motion of the bit. If desired, the mud can be introduced through the annulus and withdrawn from the drill stem in what is known as a reverse circulation system. In any event, at the surface the mud is delivered into a flow line which usually discharges over a shale shaker of the vibrating screen type which serves to separate the mud fluid from the formation cuttings. The cuttings-free mud falls through the vibrating screen into a suitable mud ditch or trough through which it is delivered to the mud storage pit. The mud fluid is then picked up by the slush pump for recirculation within the well to complete the cycle.

The principal functions of the drilling fluid are to seal the walls of the open hole, to lubricate the bit, to carry the cuttings from the bit to a point outside the well bore, to prevent the settling of cuttings and the consequent seizure of the bit, and to supply a static head within the well bore sufficient to overcome pressures encountered during the drilling which might otherwise blow the drill fluid from the well bore.

It is desired that loss of the liquid phase from the mud to the formation be maintained at a minimum. However, with a substantial static head on the formation, there is a tendency for the liquid phase to penetrate the formation with the deposition of a mud cake on the surface. If the dehydration or liquid loss of the mud is excessive, there results an undesired flocculation and failure of the mud to perform the functions outlined above. It is therefore an important object of this invention to provide a system wherein the liquid loss from a drill mud is reduced to a minimum.

According to present field procedure, the drilling mud is prepared at the well site by means of stirrers and considerable rig time is required before the mud is ready for use. It is therefore an object of my invention to provide a method and apparatus which very rapidly and completely disperses the mud-making material in the liquid phase.

During the use of the drill mud it increases in viscosity by loss of liquid to the formation and in addition by "flocculation" of the mud solids and cuttings. A condition of high viscosity of the drilling mud can interfere as much as any other factor with satisfactory drilling progress. The flocculation, which often produces this high viscosity, gives the fluid a fluffiness and interferes with the pumping and flowing of the drill mud. It appears that as the mud moves upwardly through the well casing the particles tend to flocculate and with the growth of the floc the viscosity or stiffness of the mud increases considerably. It is therefore another object of my invention to provide a novel system capable of dispersing these flocs without impeding the continuous circulation of the rotary drill mud.

In some instances it is desirable and necessary to add various plastering agents or additives to a drill mud. However, such additives and plastering agents are ordinarily separated from the mud by the shale shaker together with the well cuttings. It then sometimes becomes necessary to discontinue the use of the shale shaker in order to continuously circulate mud fluid containing the plastering agents. Accordingly, it is an object of my invention to incorporate the plastering agents in the drill mud in such a stable condition as to circulate with the drilling mud and not be removed therefrom in passing over the shale shaker.

A further object of this invention is to provide a method of preconditioning a drilling fluid which pre-conditioning assists in maintaining the desired viscosity and thixotropic properties and minimizes the loss of the liquid phase from the drilling mud. An additional object is to provide a system for conditioning drilling fluids during the progress of drilling and repeated recirculation of the drilling fluid so as to maintain these desired properties.

Still another object of the invention is to provide an improved apparatus for the pre-conditioning and reclamation of drilling fluids of this character and for their circulation during the progress of drilling. Other objects and advantages of the invention will become apparent as the description of my invention proceeds.

Figure 2:
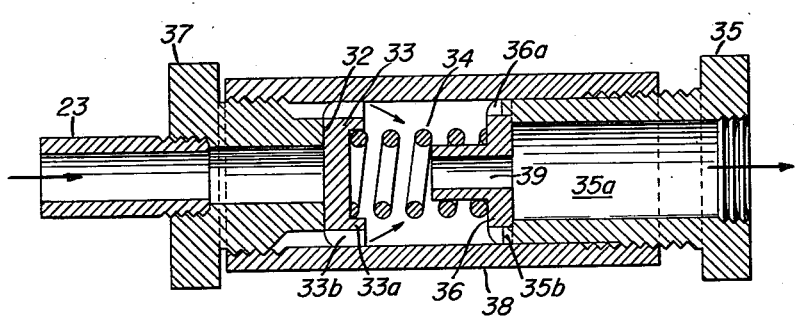

Briefly, I have discovered that a stable drilling mud having the desired characteristics can be produced or reclaimed by subjecting it to a homogenizing treatment. It has been discovered that subjecting a thixotropic plastic drilling fluid to homogenizing will reduce its liquid loss nearly to zero and very materially reduce its viscosity. For example, an emulsion mud which normally has a filtrate rate of 3 to 5 cc. in thirty minutes, after being subjected to homogenizing, had a filtrate loss of zero, and in general the mud characteristics were substantially improved as illustrated by the examples which follow. Further details of my invention will become apparent from the following description when taken in connection with the accompanying drawing which illustrates an embodiment of the apparatus for carrying out the method of this invention and wherein:

Figure 1 is a diagrammatic plan view of the mud-handling and circulating equipment; and Figure 2 is a detailed section of one type of homogenizer which may be used in the apparatus of Figure 1.

Referring to the drawing, I have illustrated diagrammatically in Figure 1 the improved mud circuit with the drilling equipment. Mud is delivered under pressure via line 10 to the swivel head 11 and flows down to the bottom of the well 12 through the stem 13 into the region of the bit 14. The mud then flows upwardly about the stem 13 within the return annulus 15 to be delivered from the well casing 16 by mud line 17. The return mud may be subjected to a screening operation by passage over a shale shaker 18 for the removal of oversize cuttings before it is delivered by line 19 to the mud pit 20. In this pit 20 the mud may be conditioned by the addition of water and/or chemicals and/or weighting agents and the like. In any event the mud is withdrawn from the pit by pump inlet line 21 and passed by the slush pump 22 and pump discharge line 23 to the homogenizer 24.

The homogenized drilling fluid is discharged from the homogenizer 24 by line 10 and a portion may be recycled to the homogenizer 24 via recycle line 26 whereas another portion is directed by line 10 for recirculation to the drill stem 13.

A hopper 27 having valve 28 may be used to introduce the mud-forming materials into pump discharge line 23 en route to the homogenizer 24. Thus if desired, the valve 29 in pump inlet line 21 may be closed; the valve 30 in line 10 closed; and the valve 31 in line 26 opened to permit the closed recycle of the drill mud constituents through the homogenizer 24 while adding additional mud-forming materials from hopper 27 metered through star valve 28 and pumping the slurry through the circuit by slush pump 22. It should be understood that the hopper and valve assembly 27—28 is diagrammatically illustrated for simplicity.

The homogenizer 24 may be of any desired type capable of handling the mud as described below. In Figure 2 I have illustrated one form of homogenizer which includes a spring-loaded valve which opens to permit a portion of the liquid to escape at high velocity through a narrow orifice between the valve seat 32 and valve disc 33. A strong spring 34 and an adjusting nut 35 which acts on a hollow thrust member 36 control the valve disc 33 and oppose the fluid pressure acting on the disc.

The liquid phase containing the undispersed mud material introduced via hopper 27 enters the homogenizer 24 through the end plug 37 by line 23. When the pressure of this stream is sufficient to overcome the thrust of the spring 34 as controlled by the adjusting nut 35, the valve disc 33 will move back slightly from the valve seat 32 to allow the stream to flow through the narrow space between the seat 32 on the end plug 37 and the face of the valve disc 33. The back of the valve disc 33 is provided with an annular shoulder 33a to accommodate the end of the spring 34 and at the periphery of the disc 33 are provided a plurality of spacing lugs 33b which permit the flow of fluid about the periphery of the disc 33.

The mud material is very finely dispersed in the liquid phase while passing through this narrow space and the homogenized mud flows into the barrel 38 and about the spring 34 and out of the barrel 38 through the channel 39 in the thrust member 36 and through the channel 35a in the adjusting nut 35 into line 10.

The back pressure at the end plug 37, and hence the movement between the valve seat 32 and the valve disc 33, are determined by the compression of the spring 34 which can be varied by the adjusting nut 35 having projecting dogs 35b which engage the lugs 36a on the periphery of thrust member 36. The pump 22 discharges through line 23 and the spring-loaded valve 32—33 opens to permit a portion of the liquid to escape as described above, and this action results in a high degree of turbulence and in the alternate application and release of pressure.

The particular form or type of homogenizing equipment is not my invention and therefore will not be described in further detail. However, it is contemplated that other homogenizers, for example of the rotating plate type, can be used and may be driven by the rotary table 25 or the prime mover for the rotary table. In one embodiment of the rotating plate type homogenizer, the upper side of the disc is partly channeled in such a way that the outward progress of a liquid introduced at its center is retarded by numerous baffles across the radial channels. With a liquid traveling at high speed the effect is to produce an extreme dispersion of particles in the liquid phase.

The drilling fluids used in drilling operations may be thixotropic fluids of the water-base or oil-base type. They consist generally of a colloidal suspension of finely ground clays of similar earthy matter in water, oil, or oil and water emulsions, to which may be added weighting agents and chemical treating agents, both of which are useful in controlling various characteristics of the fluids.

*Example I*

A slurry was formed with a bentonitic clay and flocculated with an alkali earth metal chloride (calcium chloride). The flocculated clay slurry was emulsified with crude oil although other oil-base fluids, such as kerosene, diesel fuel, and the like, may be used. A non-ionic synthetic detergent was added to the emulsion to form a preferentially oil-wet material. A black oil-base mud was prepared from these materials by the use of the homogenizer in two minutes or in about three passes through the homogenizer at 400 p. s. i. back pressure.

The oil-base drilling fluid formed by homogenizing the preferentially oil-wet material with an oil-base had a smoother appearance and improved gel characteristics with no settling as compared to the muds prepared on high speed mixers, whereas the other fluid properties were comparable. The fluid loss was extremely low and the mud was weighted to 9.5 pounds/gallon without excessive viscosity.

Contaminants such as salt, anhydride, and as much as 20 percent water do not seriously affect the mud. Oil does not separate from the mud and weighting materials show practically no tendency to settle out after the homogenizing treatment. Thus, the homogenizing of the oil-base drilling fluid provides plastering and suspending properties and a high gel strength or quasi thixotropy which prevents settling of the solids in a static system.

*Example II*

An emulsion drilling fluid of 60 parts by volume of water saturated with sodium chloride and 40 parts by volume of No. 2 fuel oil was prepared by the use of 8 pounds per barrel of commercial lecithin. Plastering properties are imparted to the drilling fluid by the addition of 20 pounds/barrel of ground limestone. This composition is normally sensitive to contamination by water, tending to become unstable and invert, and is also sensitive to contamination by large amounts of solids becoming very viscous and plastic. However, the primary emulsions of this type can be stabilized and their viscosity reduced by subjecting to an homogenizing treatment.

In tests on this water-in-oil emulsion mud, it was found that the mud homogenizer gives very complete and very fast dispersion to produce an excellent mud in one minute; or after two passes through the homogenizer at 200 p. s. i. back pressure.

In the usual preparation of this mud, 45 minutes stirring was required to reach an 0.5 cc. in 30 minutes fluid loss. Mud made with the homogenizer in one minute had a zero fluid loss in one hour and only 2.0 cc. in 18 hours with no apparent separation in the filtrate.

This mud had excellent stability with no apparent separation of the solids and liquid phases after standing one week. In drilling with this type of mud, very little loss of fluids to the formations occurs due to the extremely low filtrate loss of the homogenized mud. The small amount of fluid that is lost is pure, non-viscous oil which cannot harm the producing formations.

*Example III*

A mixture of clay and ground limestone was treated with a non-ionic detergent and the treated solids were commingled with No. 2 fuel oil as a base fluid. Upon addition of water and following homogenization by means of the homogenizer at 200 p. s. i. back pressure, this mud had a color of a clay mud and exhibited excellent viscosity, gel, and fluid-loss properties.

Although the above Examples I, II and III are directed to the oil-base type of muds, it is contemplated that improved fluids are obtainable with bentonite and other water-base mud materials by homogenizing.

The homogenizing technique has been described in connection with drill muds and it is also proposed to use it in the preparation of hydraulic fluids for use in the fracturing of well formations. Such a fracturing process is described in the Oil and Gas Journal, October 14, 1948, pages 76–78 and 103. A conventional material for this fracturing process is a gelled hydrocarbon such as gasoline to which has been added Napalm soap and a quantity of finely divided sand. It is desired to provide such a fluid which is readily pumpable into a well but which assumes a rather firm consistency adjacent the formation to be fractured. However, the fluid should be sufficiently viscous so as to support the sand en route to the formation. It is contemplated that my homogenizing technique may be employed to provide a homogenized mud or gelled gasoline and sand for use in hydraulic fracturing of wells. If desired, a wire line carrying shear elements may be reciprocated within a tubing so as to maintain the thixotropic material in an agitated state and upon reaching the relatively quiescent zone opposite the formation to be fractured the fluid will set up to form a gel containing the dispersed sand. This type of apparatus may be used to supplement the homogenizer unit incorporated with the surface equipment as described above and illustrated in the drawings.

From the above it will be apparent that I have attained the objects of my invention by providing method and means of homogenizing water- or oil-base drilling muds. In those cases where water is returned with the oil-base mud, the subsequent homogenizing will overcome the tendency to dilute the mud whereas globules of formation water entering the homogenized mud in the well can be detected electrically by known logging techniques prior to re-homogenization.

Improved results in cementing can also be obtained by homogenizing a cement slurry which permits high penetration with the slurry without excessive water loss from the slurry to the formation.

Although my invention has been described with reference to particular apparatus, method steps, and examples of drilling fluids, it should be understood that these are by way of illustration only and that modifications and alterations therein are contemplated without departing from the scope of my invention.

What I claim is:

1. The method of preparing an emulsion-type drilling fluid which comprises commingling 60 parts by volume of water saturated with sodium chloride, 40 parts by volume of fuel oil and 8 pounds of commercial lecithin per barrel of total liquid, imparting plastering properties to the resulting fluid mixture by adding 20 pounds of ground limestone per barrel of said fluid, and subjecting the admixture of liquids and ground limestone to homogenizing conditions, whereby a drilling fluid having a zero liquid loss in one hour is prepared.

2. The method of preparing and of utilizing a drilling fluid which comprises the steps of forming a substantially colloidal dispersion of clay in water, emulsifying the dispersed clay slurry with an oil base fluid by homogenizing, dispersing a plastering agent in the emulsified slurry to impart plastering properties to the drilling fluid, introducing the so-produced drilling fluid into a well bore during a well drilling operation, utilizing such homogenized drilling fluid in such drilling operation until the fluid attains a high viscosity due to deflocculation of plastering agent and accumulations of drill cuttings, removing from the well the drilling fluid containing plastering agent and drill cuttings, separating only the drill cuttings from the drilling fluid, homogenizing the drilling fluid containing plastering agent and from which the drill cuttings have been removed thereby rehomogenizing the plastering agent in the drilling fluid in the absence of the drill cuttings, and reutilizing in the drilling operation the rehomogenized fluid containing the dispersed plastering agent.

References Cited in the file of this patent
UNITED STATES PATENTS

| | | |
|---|---|---|
| 2,123,282 | Jones et al. | July 12, 1938 |
| 2,151,029 | Vander Henst | Mar. 21, 1939 |
| 2,156,333 | Cross et al. | May 2, 1939 |
| 2,219,312 | Hayward et al. | Oct. 29, 1940 |
| 2,338,174 | Garrison | Jan. 4, 1944 |
| 2,358,679 | Zacher | Sept. 19, 1944 |
| 2,407,462 | Whitely | Sept. 10, 1946 |
| 2,423,801 | Sloan | July 8, 1947 |
| 2,578,888 | Kaveler | Dec. 18, 1951 |
| 2,582,323 | Fischer | Jan. 15, 1952 |
| 2,661,334 | Lummus | Dec. 1, 1953 |

OTHER REFERENCES

"Emulsion Technology," second, enlarged edition, copyright 1946, pages 90, 91, and 106.

Oil and Gas Journal, June 30, 1949, pages 75 and 76.